United States Patent [19]

Petolino et al.

[11] Patent Number: 4,768,197
[45] Date of Patent: Aug. 30, 1988

[54] CACHE ERROR CODE UPDATE

[75] Inventors: Joseph A. Petolino, Palo Alto; Christopher D. Finan, Santa Clara; Jeffrey T. Isozaki, San Jose; Nicholas Y. Pang, Sunnyvale, all of Calif.

[73] Assignee: Amdahl Corporation, Sunnyvale, Calif.

[21] Appl. No.: 907,665

[22] Filed: Sep. 15, 1986

[51] Int. Cl.⁴ ............................................. G06F 11/00
[52] U.S. Cl. ........................................ 371/38; 371/49; 371/10
[58] Field of Search .................. 371/10, 21, 38, 37, 371/39, 25, 5, 51, 49, 43; 364/200, 900

[56] References Cited

U.S. PATENT DOCUMENTS 4,164,017 8/1979 Randall ............................ 364/200
4,342,084 7/1982 Sager ................................. 371/38
4,483,003 11/1984 Beal ................................... 371/51
4,564,944 1/1986 Arnold ............................... 371/37
4,651,321 3/1987 Woffinden ........................ 371/38
4,686,621 8/1987 Keeley ............................. 364/200

Primary Examiner—Michael R. Fleming
Attorney, Agent, or Firm—Fliesler, Dubb, Meyer & Lovejoy

[57] ABSTRACT

A system for updating an ECC code over a line in a data store when only part of the line has been updated is described. The system receives the update and its address, decodes the address to generate a first signal identifying the part of the line to be updated and a second signal identifying an un-updated part of the section. The data of the update and the first signal are used to generate a first partial error code. Data from the un-updated part of the line is read as the update is written to the store. The data from the un-updated part of the section and the second signal are used to generate a second partial error code. Finally, the first and second partial error codes are combined to generate the updated error code.

4 Claims, 2 Drawing Sheets

CACHE ERROR CODE UPDATE

CROSS-REFERENCE TO RELATED APPLICATION

CACHE STORAGE QUEUE, invented by Joseph A. Petolino et al, Ser. No. 900,640, filed on the Aug. 27, 1986 and owned by the same assignee as the present invention.

FIELD OF THE INVENTION

The present invention relates to a method and apparatus for updating error checking and correcting (ECC) codes for stored data. In particular, for data stored in error checked groups, and when updates are made to less than a full error checked group of the data, then the present invention provides a method and apparatus for updating the ECC code.

BACKGROUND OF THE INVENTION

Apparatus for storing data such as a high speed cache in data processing machines typically organize data in sections such as lines for addressing and ECC purposes.

A processing unit in the data processing machine may update only a portion of the line, such as a byte or a word. A problem arises in recomputing the ECC code for the line subject of the partial update. In the prior art, in order to update the ECC code after a partial update, the ECC code for the line prior to the update is read from the ECC cache. Also, the update is used to generate an ECC over that portion of the line to be changed. In addition, the portion of the line to be replaced by the update is read and an ECC code is generated. A new ECC code for the line is then generated by adding the ECC for the line prior to the update with the ECC code for the update and then subtracting the ECC code for the portion of the line being replaced.

This prior approach involves access to the same portion of the cache twice, once to read the old data to be replaced from the cache for the generation of the ECC for the data to be replaced, and once to write the update into the cache. A write to the same location that is to be read cannot be performed during the same cycle. Therefore, the prior approach suffered a bottleneck in reading the data to be replaced from the cache prior to writing the new data in.

In addition, an access to the cache storing the ECC code of the line prior to the update is needed. So a read of the ECC and write of the updated ECC must occur in prior systems to the same location in the ECC cache.

Further, prior designs suffered a "store-fetch interlock" for stores that occur back-to-back to the same line in the cache. Such back-to-back stores could result in the second store trying to access the ECC for the line before it has been updated from the first store. Therefore, interlock hardware is needed making the updated ECC available to the following store before writing into the cache, or delaying the following store until the update is written.

In view of the foregoing, there is needed an apparatus and method for updating an ECC code for a line in a data store that eliminates bottlenecks due to two accesses to the same store location, reduces the possibility of failures due to back-to-back stores or the need for hardware to prevent such failures, and otherwise simplifies the ECC update mechanism.

SUMMARY OF THE INVENTION

The present invention provides an apparatus and method for updating an error code, such as an ECC code, over a line in a data store when only part of the line is to be updated that improves performance over prior designs.

In a data processing machine that includes a data storage device that stores data in sections and an error code storage device that stores error codes for corresponding sections in the data storage device, the present invention provides in one aspect an apparatus for generating an updated error code for a section in response to an update including data and address information for updating a part of the section. The apparatus comprises means, connected to receive the address information, for decoding the address information to generate a first signal identifying the part of the section to be updated and a second signal identifying an up-updated part of the section. A first means receives the data of the update and the first signal and generates a first partial error code for the data of the update. A means responsive to the update and connected to the data store reads data from the un-updated part of the section. A second means receives the data from the un-updated part of the section and the second signal and generates a second partial error code for the data from the un-updated part of the section. Finally, a means receiving the first and second partial error codes combines the first and second partial error codes to generate the updated error code.

Accordingly, the present invention provides a performance enhancement by eliminating the need to read the part of the section that is being replaced by the update and eliminating the need to read the old ECC code for the section prior to the update. Therefore, according to the present invention there is no need to read data from the location in the data store to which the update is being written and there is no need to read an error code from the error code store from the location to which the updated error code is being written. Therefore, the updated error code is generated in fewer cycles and the need for store fetch interlock hardware is reduced.

DETAILED DESCRIPTION OF THE INVENTION

Figure 1:
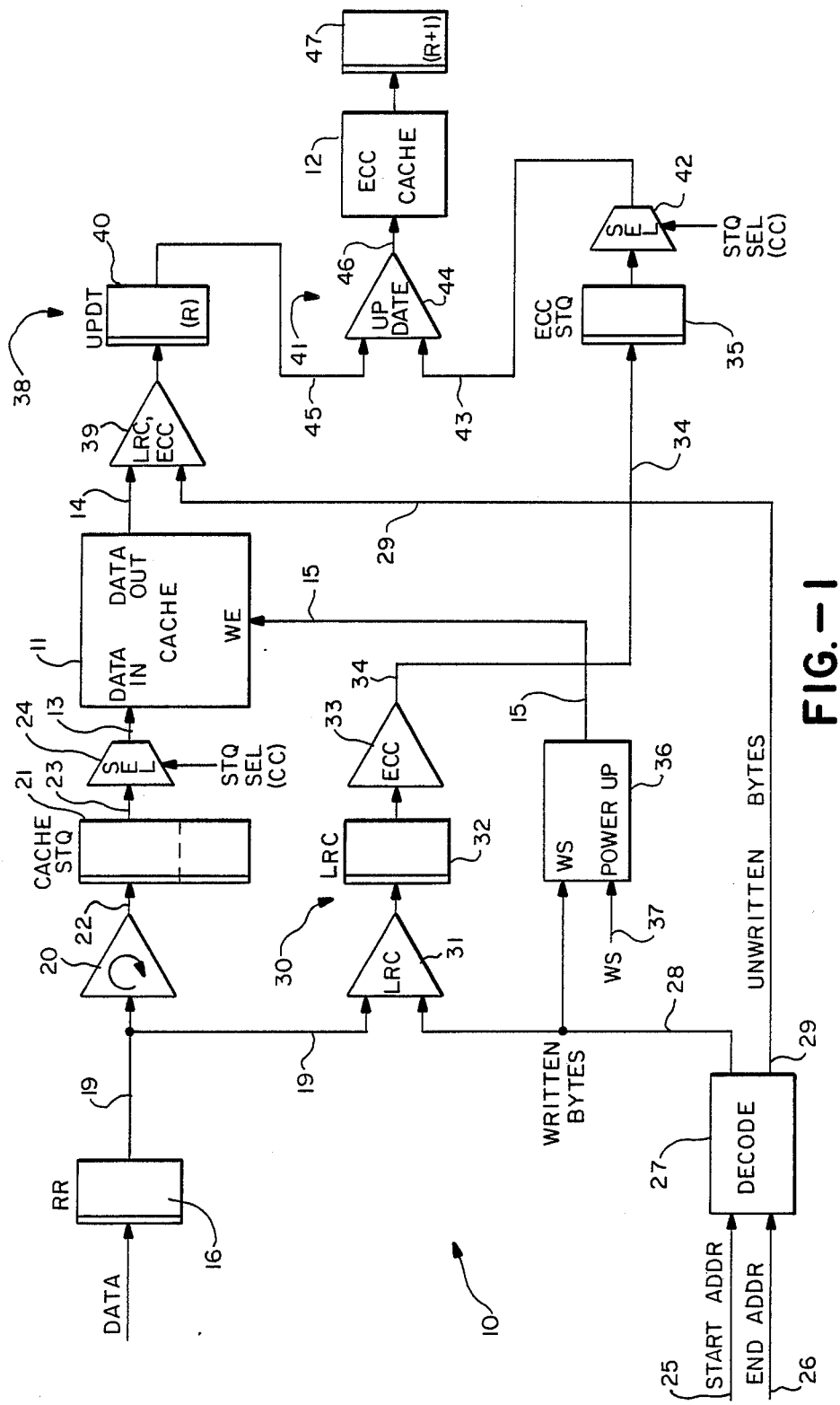
FIG. 1 is a block diagram of an apparatus according to the present invention.
Figure 2:
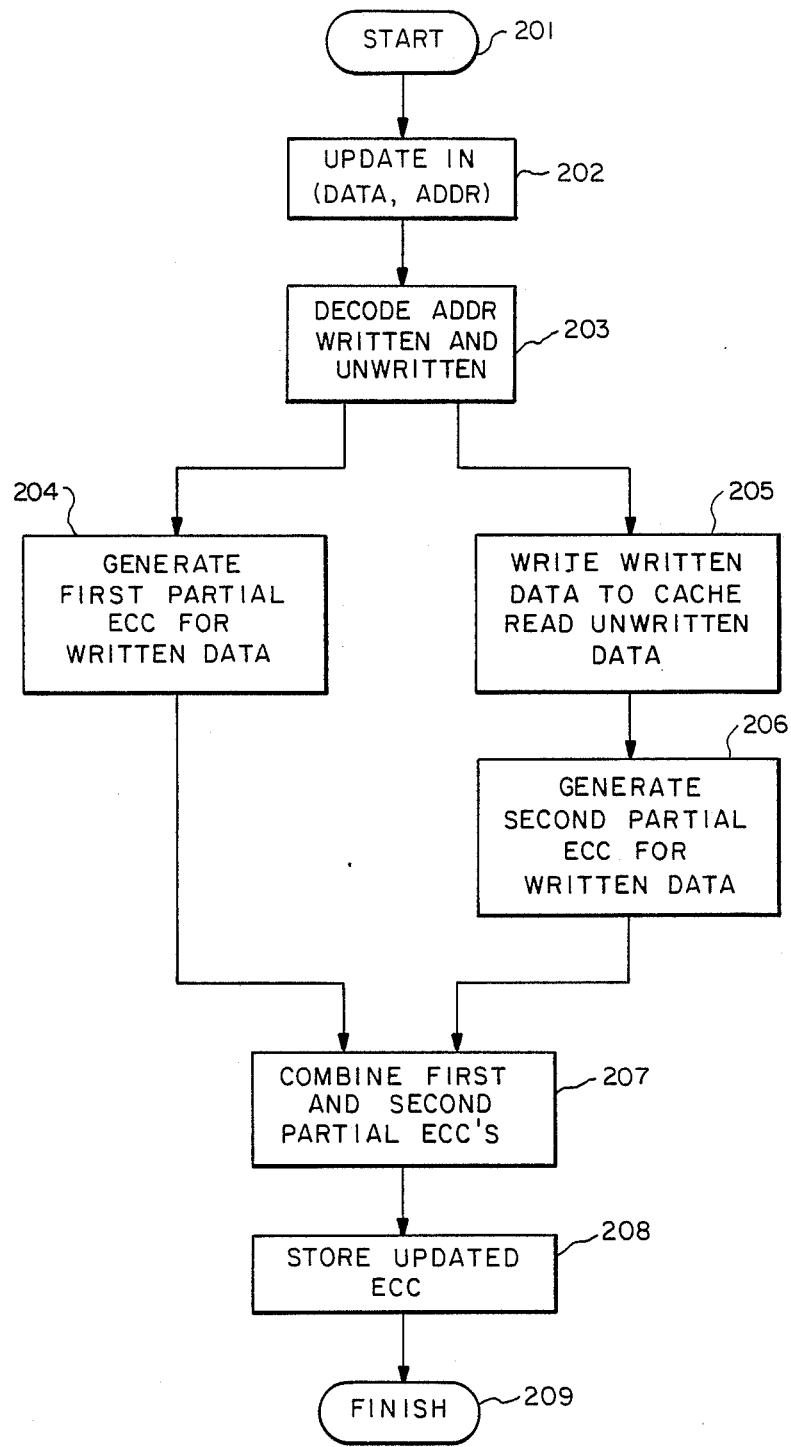
FIG. 2 is a flow chart used in illustrating the method for generating an updated error code according to the present invention.

With reference to the figures, a detailed description of a preferred embodiment of the present invention is provided. FIG. 1 illustrates hardware used in the preferred embodiment to accomplish the present invention, while FIG. 2 is a flow chart illustrating the steps involved in generating an updated error code.

FIG. 1 illustrates a portion of a data processing machine 10 that includes a data store 11 which stores data in addressable sections, such as lines, and an error code store 12 which stores error codes for corresponding sections in the data store 11.

The data store 11 is implemented in the preferred embodiment as a high speed cache made of random access memory (RAM) devices that receive data at a data-in line 13 and supply data out on a data-out line 14. A write enable signal on line 15 strobes the locations in the RAM's to which the data-in line is supplying data. Valid data is available at the data-out line 14 for all locations in the RAM's that are not enabled by the write enable signal on line 15 to receive data. Therefore, a part of a line of data can be written to the RAM's during the same cycle as a different part of the same line is read out on the data-out line 14. RAM's having this characteristic are known in the prior art.

Data is supplied to the data store 11 in the preferred embodiment from a result register 16, typically located in an execution unit of the data processing machine. The output of the result register on line 19 is supplied to line rotation logic 20 that controls the loading of the data into a storage queue register 21. A detailed description of a cache storage queue including a plurality of registers such as the register 21 is provided in the above-referenced co-pending U.S. patent application entitled CACHE STORAGE QUEUE, and such description is incorporated by reference as if fully set forth herein. The cache storage queue register 21 stores the data from the rotation logic across line 22 for supply across line 23 to a store queue selector 24. The store queue selector 24 operates as described in the incorporated application entitled CACHE STORAGE QUEUE. The output of the store queue selector 24 supplies data on line 13 into the data store 11.

Address information, including a starting address on line 25 and an ending address on line 26, is supplied to a means 27 for decoding the address information to generate a first signal on lline 28 indicating the part of the line to be written by the data in the result register 16. In addition, a second signal is generated on line 29 by the decoding means 27, indicating the part of the line that is not being written. As is well known in the art, the value of the first signal may indicate both the written and unwritten parts so that the same value is supplied as well for the second signal, or vice-versa. The first signal from line 28 is supplied as one input to an error code generating means designated generally by 30. The second input to the error code generating means 30 is the output of the result register 16 across line 19. A longitudinal redundancy code generator 31 generates columnwise parity over the bytes in the update, as described below, and loads the columnwise parity into the register 32. The output of the register 32 is supplied to an ECC code generator 33 which logically reduces the columnwise parity code and supplies a resulting first partial error code across line 34 to an ECC store queue register 35. An ECC store queue register is maintained for each of the registers in the cache storage queue such as register 21. However, for the purposes of this invention, only one ECC store queue register is shown.

As the update is being selected from the cache storage queue register 21 for writing to the cache 11, the first signal from line 28 that identifies the bytes to be written in the line are supplied to a write strobe power-up logic 36. A second input to the write strobe power-up logic 36 is a clock signal designated the write strobe on line 37 for clocking the RAM's in the data store 11. The output of the write strobe power-up logic 36 is supplied on line 15 as the write enable input to the cache 11. As described above, when the write enable signal on line 15 enables writing to a specified part of a data line, data from the line is available on the data-out line 14. The part of the data line being written during the read is of an uncertain value.

When the store queue selector 24 supplies data from the cache storage queue 21 to the cache 11 to be written, a second error code generating means designated generally by 38 reads the balance of the line on line 14 and receives the second signal on line 29 identifying the parts of the line that are not being written. In response to the second signal, the part being written is masked off in the logic 39. The error code generating means 38 includes logic for generating an error code by taking columnwise parity and then reducing the columnwise parity to an ECC code in an error code generating logic 39. The output of the error code generating logic 39 is supplied to an error code update register 40.

At this point, the error code update register 40 stores a second partial error code over the portion of the line that is not being written by the update and the ECC store queue register 35 stores the first partial error code over the part of the line being written by the update.

In order to generate the updated ECC code and write it into the error code store 12, a means, designated generally as 41, is included for combining the first partial error code from register 35 with the second partial error code from register 40.

The first partial error code stored in the ECC store queue register 35 is selected by a store queue selector 42 after its corresponding data has been selected into the cache by the selector 24. The output of the selector 42 is supplied on line 43 as one input to the ECC update logic 44. The second partial error code from the ECC update register 40 is supplied on line 45 as a second input to the update logic 44. In the update logic 44, the partial error codes are combined to generate a full error code for the line. The full error code is supplied across line 46 to the error code store 12. In a following cycle, the error code store 12 can be accessed to read the error code for the updated line into a register 47.

In operation, the data processing apparatus 10 operates in a pipeline fashion. Two flows of the pipeline are typically used, designated a store flow for storing data into the cache storage queue 21 and corresponding ECC store queue 35 and a write flow for writing data from the cache storage queue 21 into the cache 11 and from the corresponding ECC store queue 35 into the ECC cache 12. The pipeline flow includes cycles P-A-B-R where each letter in the flow represents a cycle of the pipeline. The result register 16 is loaded asynchronously from the execution unit. The cache store queue register 21 and the longitudinal redundancy code register 32 are loaded at least as early as the B cycle of the cache write flow. The cache is accessed after the B cycle and before the R cycle. The ECC update register 40 and the ECC store queue register 35 are loaded at least as early as the R cycle of the same cache write flow. Access to the ECC cache 12 occurs after the R cycle.

For a store flow into the cache storage queue, the ECC characters over the bytes that are being written to the cache is generated by the error code generating means 30 and stored in the ECC store queue register 35. Legal lengths of updates to be sent to the cache 11 are consecutive bytes 0–16, 32 or 63 (a line being 64 bytes long). The following diagram illustrates a store flow:

| P | A | B | R | |
|---|---|---|---|---|
| | | |—| | | STORE flow |
| | | | |—| | Allocate DATA into Cache STQ |
| | | | |—| | Allocate ECC into ECC STQ |

When writing from the cache store queue register 21 and the ECC store queue register 35 into the cache and ECC cache, respectively, two situations can occur. First, in a machine having the legal lengths as discussed above, a write of 16, 32 or 64 bytes can occur or a write of 15 or fewer bytes can occur.

The cache store queue register 21 can accumulate successive stores into the register in legal lengths of 32 bytes or 16 or fewer bytes because in the embodiment shown, the error code is generated over 16 byte sections. For writes of 16 or 32 bytes, the error code from the ECC store queue register 35 is complete and the error code from the update register 40 is invalid so the update logic 44 supplies the error code directly from the ECC store queue 35 to the ECC cache 12. The 16 or 32 byte write flow is illustrated as follows:

| P | A | B | R | WRITE flow |
|---|---|---|---|---|
|   | \|—\| |   |   | Write DATA into Cache from Cache STQ |
|   |   | \|—\| |   | Write ECC into ECC RAMs from ECC STQ |

For write flows of 15 or fewer bytes, the bytes that are not being written to the cache 11 are read out of the cache on line 14 to the error code generating logic 39 during the B cycle. A partial error code is generated over those bytes and stored in the update register 40. In this case, this partial error code from register 40 is supplied on line 45 to the update logic 44 and combined with the partial error code from the ECC stores queue register 35 and written into the error code store 12. The write flow for 15 or fewer bytes is illustrated as follows:

| P | A | B | R | WRITE flow |
|---|---|---|---|---|
|   | \|—\| |   |   | Write bytes into Cache RAMs from Cache STQ |
|   | \|—\| |   |   | Read unwritten bytes from Cache RAMs |
|   |   | \|—\| |   | Write updated ECC into ECC RAMs |

FIG. 2 is a flow chart illustrating a generalized method of the present invention.

The present invention starts in response to an instruction to load a portion of a section stored in the cache with new data (block 201). The update is received including the data and address information identifying the part of the section to be updated (block 202). The address information is decoded to generate a first signal identifying the part of the section to be written to, and a second signal identifying the unwritten part of the section (block 203). A first partial error code is generated for the data of the update in response to the data and the signal identifying the part of the section to be written (block 204). The data is written to the cache and the unwritten part of the section is read, during the same cycle in the preferred embodiment (block 205). The unwritten part of the section is used to generate a second partial error code for the data in the section that is not updated in conjunction with the second signal identifying the unwritten data (block 206). The first partial error code and second partial error code are combined to generate the updated error code (block 207). Finally, the updated error code is stored in an error code store (block 208) and the algorithm is finished (block 209).

In the preferred embodiment, the error code is an ECC code over 8-byte doublewords. An error checked section of the cache includes two 8-byte doublewords for a total of 16-bytes, a "quarterline". The error code store 12 stores two ECC codes for each 16-byte quarterline. The ECC characters for each 8-byte doubleword are generated from a longitudinal redundancy code. The longitudinal redundancy code is generated by aligning the 8-bytes in a matrix in which each byte is a row and taking even parity over each column in the matrix. Table 1 illustrates the generation of longitudinal redundancy code (LRC) bits for a sample group of 8 bytes.

TABLE 1

| byte position | bit position | | | | | | | | |
|---|---|---|---|---|---|---|---|---|---|
|   | 0 | 1 | 2 | 3 | 4 | 5 | 6 | 7 | P |
| 0 | 0 | 1 | 1 | 0 | 0 | 0 | 0 | 1 | 0 |
| 1 | 0 | 0 | 0 | 0 | 0 | 0 | 0 | 0 | 1 |
| 2 | 1 | 1 | 1 | 1 | 1 | 1 | 1 | 1 | 1 |
| 3 | 0 | 1 | 0 | 1 | 0 | 1 | 0 | 1 | 1 |
| 4 | 1 | 1 | 1 | 1 | 1 | 1 | 1 | 1 | 1 |
| 5 | 1 | 1 | 1 | 1 | 1 | 1 | 1 | 1 | 1 |
| 6 | 1 | 1 | 1 | 1 | 1 | 1 | 1 | 1 | 1 |
| 7 | 1 | 1 | 1 | 1 | 1 | 1 | 1 | 1 | 1 |
| LRC bits | 1 | 1 | 0 | 0 | 1 | 0 | 1 | 1 | 1 |

The longitudinal redundancy code logic 31 and error code generating logic 39 perform this function over the data of the update and the unwritten part of the section, respectively. The LRC bits themselves are stored in the register 32 for the generation of the first partial error code in the embodiment shown. However, the LRC bits are not independently registered in the logic 39 for timing considerations.

The error checking and correcting (ECC) bits are generated according to Table 2. The Hamming matrix of Table 2 is used to generate the ECC bits C0–C5. C0 is equal to LRC bit 1 exclusive-OR LRC bit 2. ECC bit C1 is equal to LRC bit 0 exclusive-OR LRC bit 2. ECC bit C2 is equal to LRC bit 4 exclusive-OR LRC bit 5. ECC bit C3 is equal to LRC bit 3 exclusive-OR LRC bit 5. ECC bit C4 is equal to LRC bit 7 exclusive-OR LRC bit P. ECC bit C5 is equal to LRC bit 6 exclusive-OR LRC bit P.

For example, using the LRC bits generated in Table 1, the ECC bits for the 8-bytes of Table 1 are 111000:

TABLE 2

| ECC bits | LRC bits | | | | | | | | |
|---|---|---|---|---|---|---|---|---|---|
|   | 0 | 1 | 2 | 3 | 4 | 5 | 6 | 7 | P |
| C0 |   | x | x |   |   |   |   |   |   |
| C1 | x |   | x |   |   |   |   |   |   |
| C2 |   |   |   |   | x | x |   |   |   |
| C3 |   |   |   | x |   | x |   |   |   |
| C4 |   |   |   |   |   |   |   | x | x |
| C5 |   |   |   |   |   |   | x |   | x |

The error checking and correcting code generated as described above has a property that a partial error code over bytes being updated can be combined with a partial error code over the bytes that are not changed in the update to generate a full updated error code. For example, consider the 8 bytes shown in Table 1. The LRC bits are 110010111 and the ECC characters are 111000. Suppose bytes 3, 4 and 5 are changed so that the resulting 8 bytes are as shown in Table 3:

TABLE 3

| Byte | Updated Section: Bit | | | | | | | | |
|---|---|---|---|---|---|---|---|---|---|
|   | 0 | 1 | 2 | 3 | 4 | 5 | 6 | 7 | P |
| 0 | 0 | 1 | 1 | 0 | 0 | 0 | 0 | 1 | 0 |
| 1 | 0 | 0 | 0 | 0 | 0 | 0 | 0 | 0 | 1 |
| 2 | 1 | 1 | 1 | 1 | 1 | 1 | 1 | 1 | 1 |
| 3 | 0 | 0 | 0 | 0 | 0 | 0 | 0 | 0 | 1 |

TABLE 3-continued

| Byte | Updated Section: Bit | | | | | | | | |
|------|---|---|---|---|---|---|---|---|---|
|      | 0 | 1 | 2 | 3 | 4 | 5 | 6 | 7 | P |
| 4    | 0 | 1 | 0 | 0 | 1 | 0 | 0 | 1 | 0 |
| 5    | 1 | 0 | 1 | 1 | 0 | 1 | 1 | 0 | 0 |
| 6    | 1 | 1 | 1 | 1 | 1 | 1 | 1 | 1 | 0 |
| 7    | 1 | 1 | 1 | 1 | 1 | 1 | 1 | 1 | 1 |
| LRC  | 0 | 1 | 1 | 0 | 0 | 0 | 0 | 1 | 1 |

The resulting LRC bits due to the update for all 8 bytes are 011000011 and the resulting ECC characters are 010001.

Using the algorithm according to the present invention, the part of the error checked section being updated is used to generate a partial error code. Thus, as shown in Table 4, the longitudinal redundancy code over the written bytes is 111111111 and the partial error code over the written bytes is 000000.

TABLE 4

| Byte | Bit | | | | | | | | |
|------|---|---|---|---|---|---|---|---|---|
|      | 0 | 1 | 2 | 3 | 4 | 5 | 6 | 7 | P |
| 0    |   |   |   |   |   |   |   |   |   |
| 1    |   |   |   |   |   |   |   |   |   |
| 2    |   |   |   |   |   |   |   |   |   |
| 3    | 0 | 0 | 0 | 0 | 0 | 0 | 0 | 0 | 1 |
| 4    | 0 | 1 | 0 | 0 | 1 | 0 | 0 | 1 | 0 |
| 5    | 1 | 0 | 1 | 1 | 0 | 1 | 1 | 0 | 0 |
| 6    |   |   |   |   |   |   |   |   |   |
| 7    |   |   |   |   |   |   |   |   |   |
| LRC" | 1 | 1 | 1 | 1 | 1 | 1 | 1 | 1 | 1 |
| ECC" |   | 0 | 0 |   | 0 | 0 |   | 0 | 0 |

The part of the error checked section that is not being updated, that is the unwritten bytes of the section, are shown in Table 5. As can be seen, the longitudinal redundancy code for the unwritten bytes is 100111100 and the partial error code for the unwritten bytes is 010001.

TABLE 5

| Byte | Bit | | | | | | | | |
|------|---|---|---|---|---|---|---|---|---|
|      | 0 | 1 | 2 | 3 | 4 | 5 | 6 | 7 | P |
| 0    | 0 | 1 | 1 | 0 | 0 | 0 | 0 | 1 | 0 |
| 1    | 0 | 0 | 0 | 0 | 0 | 0 | 0 | 0 | 1 |
| 2    | 1 | 1 | 1 | 1 | 1 | 1 | 1 | 1 | 1 |
| 3    |   |   |   |   |   |   |   |   |   |
| 4    |   |   |   |   |   |   |   |   |   |
| 5    |   |   |   |   |   |   |   |   |   |
| 6    | 1 | 1 | 1 | 1 | 1 | 1 | 1 | 1 | 1 |
| 7    | 1 | 1 | 1 | 1 | 1 | 1 | 1 | 1 | 1 |
| LRC" | 1 | 0 | 0 | 1 | 1 | 1 | 1 | 0 | 0 |
| ECC" |   | 0 | 1 |   | 0 | 0 |   | 0 | 1 |

The combination of the partial error code for the written bytes with the partial error code for the unwritten bytes is generated by taking a bitwise exclusive-OR of the partial ECC codes. The result is equal to 010001, which is exactly the error code predicted time Table 3.

It should be appreciated that other error codes can be used that have the property that partial codes can be combined to generate a full error code.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in the art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

We claim:

1. In a data processing machine that includes a data store storing data in addressable sections and an error code store storing error codes for corresponding sections, an apparatus for generating an updated error code for a section in response to an update including data and address information for updating a part of the section, comprising:

means, connected to receive the address information of the update, for decoding the address information to generate a first signal identifying the part of the section to be updated and to generate a second signal identifying a un-updated part of the section;

first means, connected to receive the data of the update and to receive the first signal from the means for decoding, for generating a first partial error code for the update;

means, connected to the data store and the means for decoding, for reading data from the un-updated part of the section;

second means, connected to the means for reading and the means for decoding, for generating a second partial error code for the un-updated part of the section in response to the data from the un-updated part of the section and the second signal; and means, connected to the first means for generating and second means for generating, for combining the first and second partial error codes to generate the updated error code.

2. The apparatus of claim 1, wherein the data processing machine includes means for writing the data of the update to the data store during a cycle and the means for reading reads the un-updated part of the section during the same cycle.

3. In a data processing machine that includes a data store storing data in addressable sections and an error code store storing error codes for the respective sections, a method for generating an updated error code for a section in response to an update including data and address information for updating a part of the section, comprising the steps of:

decoding the address information to generate a first signal identifying the part of the section to be updated and to generate a second signal identifying an un-updated part of the section;

generating a first partial error code for the data of the update in response to the data of the update and the first signal;

reading data from the un-updated part of the section in response to the update;

generating a second partial error code for the data from the un-updated part of the section in response to the data from the un-updated part of the section and the second signal; and combining the first and second partial error codes to generate the updated error code.

4. The method of claim 3, wherein the step of reading occurs during a cycle and further including the step of: writing the data of the update to the data store during the same cycle as the step of reading.

* * * * *